April 28, 1925.
C. A. NERACHER
MOTOR CYCLE
Filed April 18, 1919
1,535,680
2 Sheets-Sheet 1
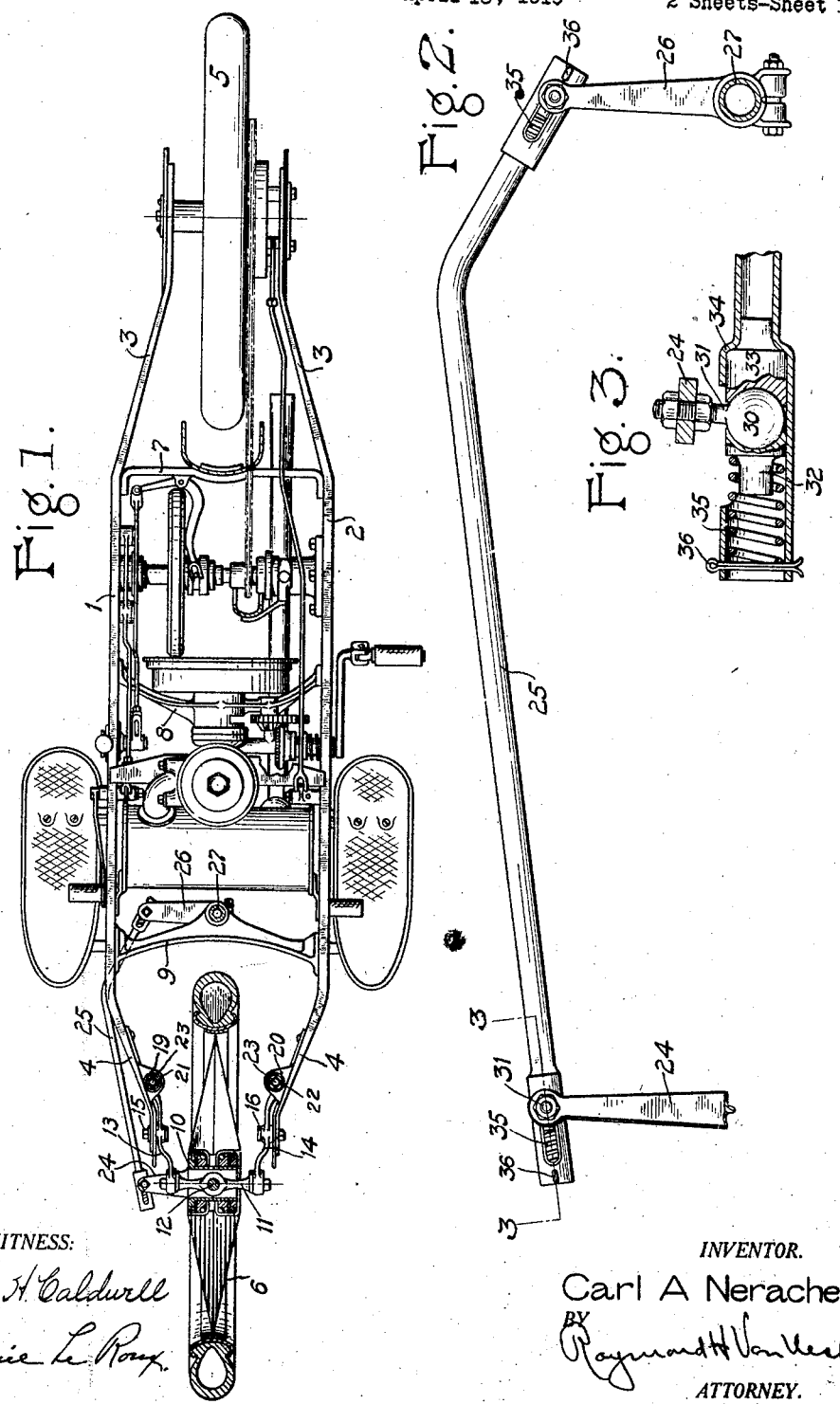
WITNESS:
Burr H. Caldwell
Eugenie Le Roux
INVENTOR.
Carl A Neracher
BY
Raymond H Van Vleet
ATTORNEY.

April 28, 1925.
C. A. NERACHER
MOTOR CYCLE
Filed April 18, 1919
1,535,680
2 Sheets-Sheet 2
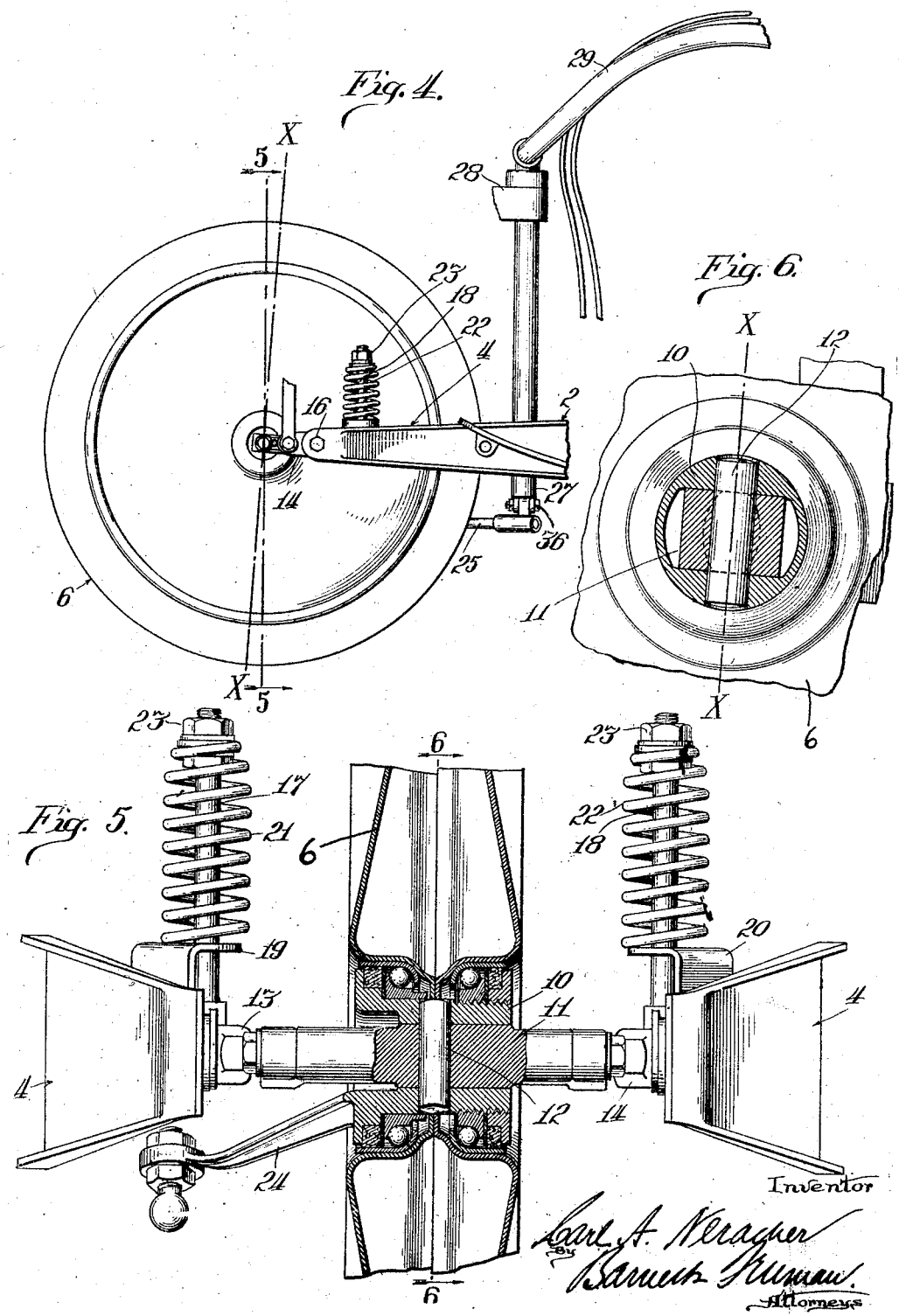

Patented Apr. 28, 1925.

1,535,680

UNITED STATES PATENT OFFICE.

CARL A. NERACHER, OF SYRACUSE, NEW YORK, ASSIGNOR, BY MESNE ASSIGNMENTS, TO NER-A-CAR CORPORATION, A CORPORATION OF NEW YORK.

MOTOR CYCLE.

Application filed April 18, 1919. Serial No. 290,979.

*To all whom it may concern:*

Be it known that I, CARL A. NERACHER, a citizen of the United States, residing at Syracuse in the county of Onondaga and State of New York, have invented new and useful Improvements in Motor Cycles, of which the following is a specification.

This invention relates to self-propelled vehicles, more particularly of the motor-cycle type, provided with a single rear driving wheel and a front steering wheel.

The object of the invention is to provide a novel and improved front wheel and steering assembly which through elimination of the usual front fork and its steering head, and by mounting the front wheel on a forwardly extending pivoted and resiliently supported structure, and, furthermore, by the provision of a steering post, or equivalent element, having an articulated draglink connection extending directly to the front wheel, simplifies and strengthens the front part of the motorcycle and facilitates the control thereof besides giving the front wheel an adequate range of free up and down cushioned movements in traveling over road inequalities that adds greatly to the ease and comfort of the rider. The structure on which the front wheel is mounted is, in effect, a rigid yoke pivoted to the forward part of the frame so that it can turn with complete freedom on its pivots (except so far as these movements are cushioned by springs interposed between the yoke and frame) the drag link steering connection being such as in no way to hamper the up and down movements of the wheel. These features, combined with the mounting of the wheel for turning movements on an axis inclined upwardly and rearwardly from the vertical, provide very effective means for preventing disagreeable and destructive shocks against the front wheel, besides giving an arrangement whereby the front wheel when turned out of alignment with the rear wheel, in steering or when an obstruction is met, will tend to automatically return to such alignment, and this regardless of the angular position of the yoke carrying the steering wheel which will vary according to the weight of the rider on the machine and with the oscillatory movement as the machine passes over inequalities of the road.

The invention is illustrated in a preferred embodiment, in the accompanying drawings wherein—

Fig. 1 is a plan view, partly in section, of a motorcycle having the front wheel and steering assembly of my invention.

Fig. 2 is a plan view showing the steering connection between the front wheel and steering post.

Fig. 3 is a sectional view on line 3—3 of Fig. 2.

Fig. 4 is a fragmentary elevation of the forward part of the machine.

Fig. 5 is a sectional view on line 5—5 of Fig. 4, and

Fig. 6, is a sectional view on line 6—6 of Fig. 5.

The motor-cycle comprises a supporting frame in which is mounted a rear driving wheel and a front steering wheel. The motor and transmission mechanism are directly mounted on the frame.

The frame is of exceedingly simple yet rigid construction, comprising a pair of side bars 1 and 2 spaced apart and parallel throughout their central portions and bent inwardly toward each other at their rear ends as at 3 and at the front ends as at 4. The driving wheel 5 is mounted near the rear of the bent-in portions 3. A steering wheel 6 is mounted between the forward bent-in portions 4 of the frame. The central parallel portions of the side bars are spaced apart and braced by suitable braces 7, 8 and 9, which also serve to support and carry the transmission mechanism, the engine and portions of the steering mechanism. The general construction of the motorcycle and its transmission and engine form no part of the invention herein claimed, these features being the subject matter of certain of my copending applications, to-wit, Serial No. 332,243 filed October 21, 1919, Serial No. 480,770 filed June 27, 1921 and Serial No. 491,781, filed August 12, 1921, and will not be further described in this application which is confined to the front wheel mounting and steering devices.

The steering wheel 6 is journalled on a collar or hollow member 10 and has suitable ball or other bearings, as desired. The collar 10 surrounds a non-rotatable axle 11 to which it is pivoted for steering by means of a pivot pin 12 extending through the axle at right angles to its axis. The pivot pin 12 is preferably fixed in the axle 11 and rotatable in its bearings in the collar 10.

The pivot pin 12 is in a vertical plane but slightly inclined rearwardly at its upper end through a small angle, as illustrated in Figures 4, 5 and 6. In Figs. 4 and 6 the line X—X forms an extension of the axis of the pin and the angle of inclination is apparent from comparison with the vertical sectional line 5—5 of Fig. 4. This inclination of the pivot pin is necessary in a practical motor-cycle of this character. Without this feature balancing is practically impossible at low speeds and steering at any speed is rendered difficult and dangerous. With this feature, balancing at low speeds and steering at all speeds are rendered easier and partly automatic, by reason of the fact that a caster effect is thereby provided, so that the steering wheel tends to automatically remain in its straight-ahead position and when turned, any side thrust from the roadway tends to automatically bring the wheel back to its normal position and to hold it there.

The axle 11 extends through the collar 10 and projects beyond each side of the steering wheel. The respective ends of the axle are secured to rearwardly extending levers 13—14, which extend along the inside of the forward portions 4 of the frame side bars. These levers are pivoted to the respective frame side members at 15, 16. The levers extend rearwardly of the pivot points and carry upright suspension rods 17—18 which are loosely guided for vertical movement in brackets 19 and 20 rigid with the corresponding frame side bars. Coil springs 21—22 surround these suspension rods and are securely anchored at the upper ends of the rods by clamping nuts 23 and at the lower ends by passing through and engaging the brackets 19 and 20. This construction of levers, suspension rods and springs provides an efficient resilient mounting for the front end of the frame, whereby the road shocks are minimized.

A steering arm 24, rigid with the collar 10, extends to one side and beyond the end of the axle 11, so as not to interfere with the parts of the frame. The steering arm is connected through a bent steering link 25 to the outer end of a steering lever 26 carried by the lower end of a vertical steering rod 27. The steering rod 27 is rotatably supported at its lower end in the brace 9 and near its upper end in a bearing member 28 (shown fragmentarily in Fig. 4) which is carried by a forward part of the vehicle body (not shown). The steering rod is provided with the handle-bars 29 at its upper end.

The ends of the steering link 25 are respectively connected to the steering arm 24 and the steering lever 26 by resilient ball and socket pivots shown in detail in Fig. 3. The resilient pivot connection is formed by a ball 30 carried within the tubular end of the steering link and provided with an attaching stud 31 extending through a longitudinal slot in the link. The ball rests and is rotatable between yieldingly held cupped members 32, 33, fitting and longitudinally slidable within the tubular end of the link. The cup 33 rests against an annular shoulder 34 in the link and the cup 32 is pressed toward the ball and the cup 33 by a coiled thrust spring 35 having a bearing at one end on the outer face of the cup 32 and at the other end on a cotter-pin 36. The attaching stud 31 on the ball passes through and is clamped to the steering arm 24 or the steering lever 26, as the case may be, the construction at both ends of the steering link being identical. This construction takes up wear and lost motion in the pivots and prevents looseness of the steering connections, and also minimizes the vibration and shocks which would otherwise be transmitted through the steering mechanism to the handle bars.

The embodiment of the invention herein described is illustrative of its principles and it is obvious that various other embodiments may be made, varying in details of construction and arrangement, without departing from the principles of the invention as defined in the appended claims.

What I claim as new and desire to secure by Letters Patent of the United States, is—

1. A motor-cycle having a frame including a pair of substantially horizontal side bars spaced apart, a pair of levers each pivotally attached at a point intermediate its ends to one of said side bars near the forward end thereof, resilient means connected with the rear ends of the lever and with the frame tending to hold said levers in substantially forward alignment with said side bars, and a steering wheel rotatably mounted between the forwardly extending ends of said levers.

2. A motor-cycle having a rigid frame provided with a forwardly extending pair of side bars spaced apart, a pair of levers each pivoted near the forward end of one of said side bars and extending beyond the forward ends thereof in substantial alignment therewith, a suspension rod carried by each lever, a spring arranged between the rear end of each lever and corresponding side bar and exerting its force to resiliently hold said levers in position, an axle fixed between the outer ends of said levers, a collar surrounding said axle and formed with a laterally projecting arm, a wheel rotatable on said collar, means for pivotally connecting the collar and axle to permit steering movements of the wheel, a steering column, and a link connecting the lower end of the steering column with the arm on said collar.

In witness whereof, I have hereunto subscribed my name.

CARL A. NERACHER.